United States Patent [19]

Yoshigai

[11] 4,023,653
[45] May 17, 1977

[54] BRAKE ADJUSTING DEVICE FOR BICYCLES

[75] Inventor: Toshiharu Yoshigai, Higashi-Osaka, Japan

[73] Assignee: Yoshigai Kikai Kinzoku Co., Ltd., Japan

[22] Filed: Dec. 8, 1975

[21] Appl. No.: 638,913

[30] Foreign Application Priority Data

Aug. 2, 1975 Japan .................................. 50-94416

[52] U.S. Cl. .................................... 188/24; 74/489;
188/2 D; 188/71.7; 188/196 M
[51] Int. Cl.² ........................ B62L 3/02; F16C 1/22
[58] Field of Search ............... 188/71.7, 24, 196 M,
188/2 D, 25, 26, 27; 74/489, 488, 501 R;
192/111 R

[56] References Cited

UNITED STATES PATENTS 3,941,215   3/1976   Schoch .................................. 188/24

FOREIGN PATENTS OR APPLICATIONS 980,091   12/1950   France .................................. 188/24
1,002,446   10/1951   France .................................. 188/24

*Primary Examiner*—George E. A. Halvosa
*Attorney, Agent, or Firm*—Armstrong, Nikaido & Marmelstein

[57] ABSTRACT

Device comprising an adjusting device provided at least at one end of a bowden cable for transmitting a grasping force on a brake operating lever in a direction to actuate brake shoes. The adjusting device includes a gauge member having a bore for passing the inner element of the cable therethrough and a hole or recess formed at one end of the bored portion and having a depth to determine a proper brake clearance, a nut having a portion shaped to fit in the recess of the gauge member and a portion of a shape unfittable in the recess when turned through a desired angle, and an adjusting screw member screwed in the nut and connected to the outer element of the cable. While the nut is disengaged from the recess of the gauge member, the adjusting screw member is advanced on the nut in screw-thread engagement therewith until the ends of the brake shoes come into contact with the rim and, after the brake shoes contact the rim, the nut is fitted into the recess of the gauge member to thereby give the proper brake clearance.

4 Claims, 9 Drawing Figures

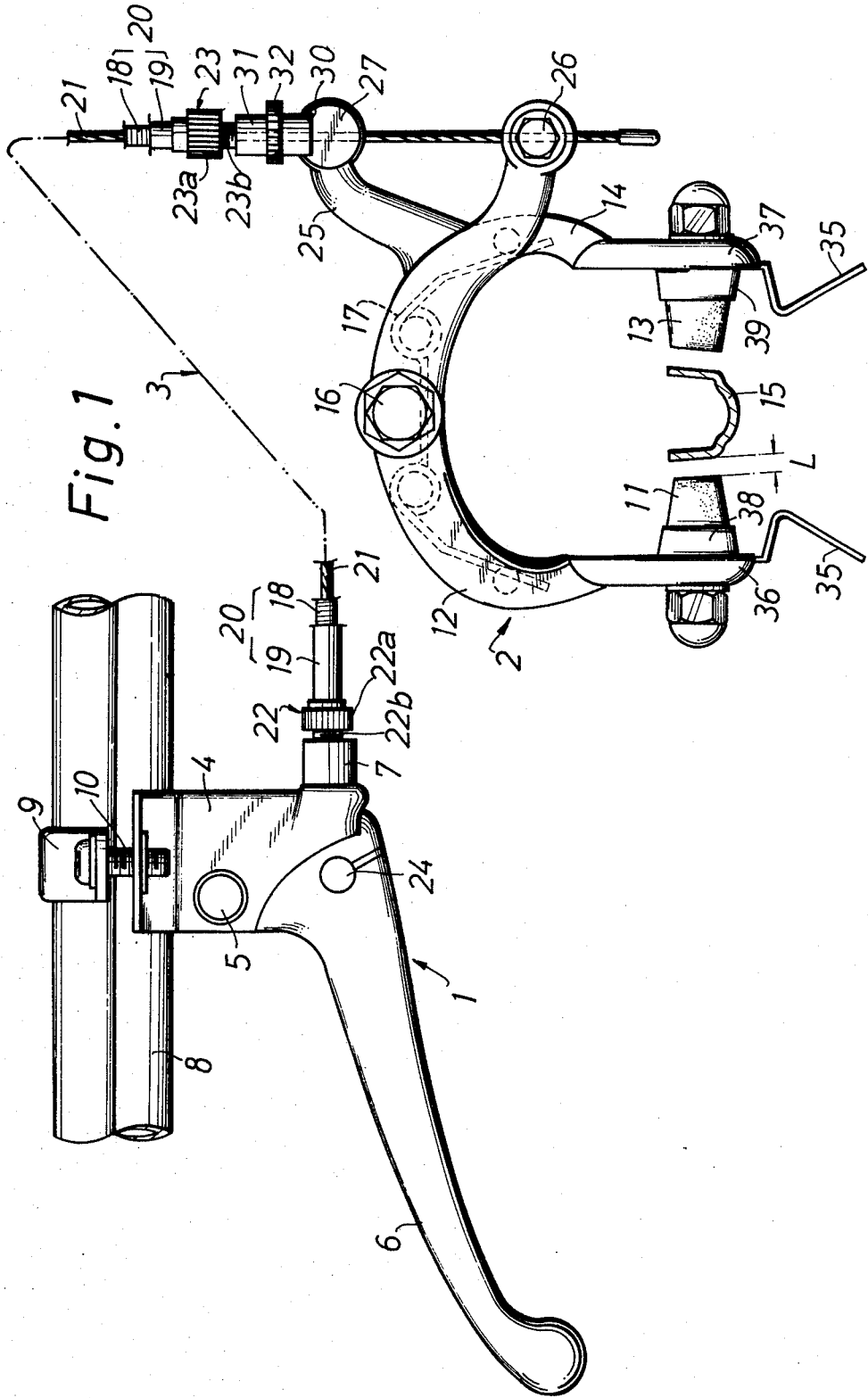

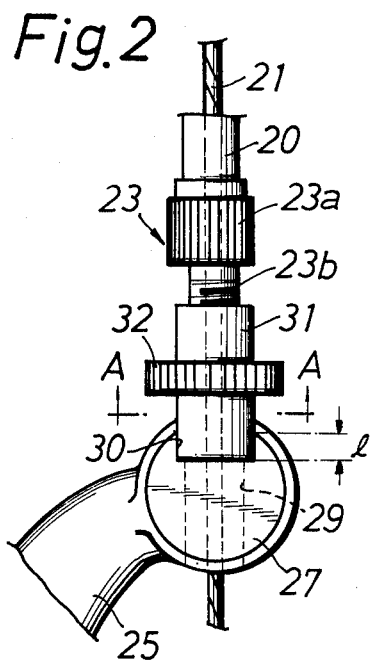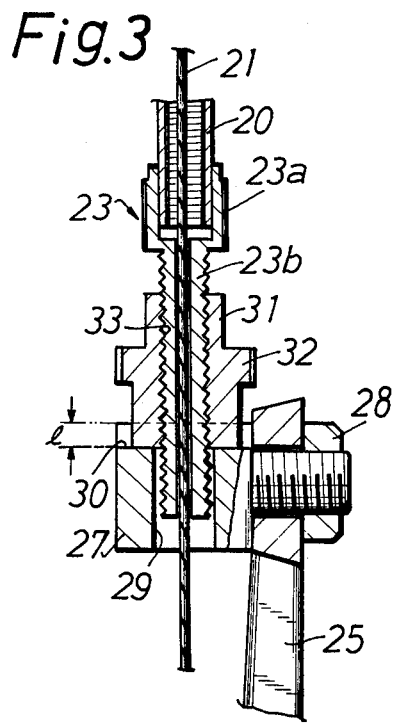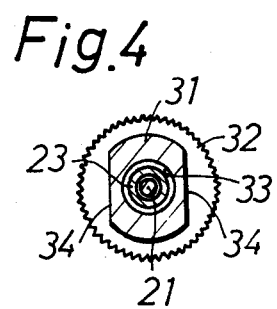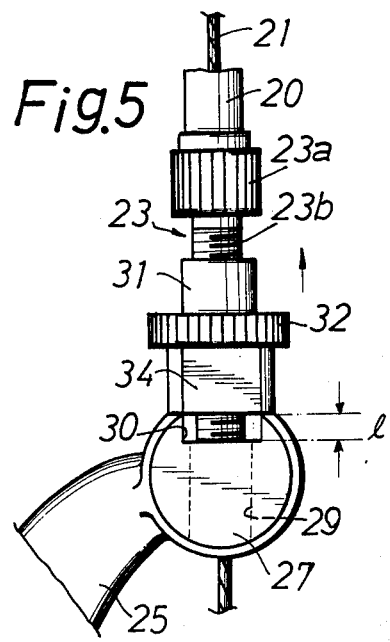

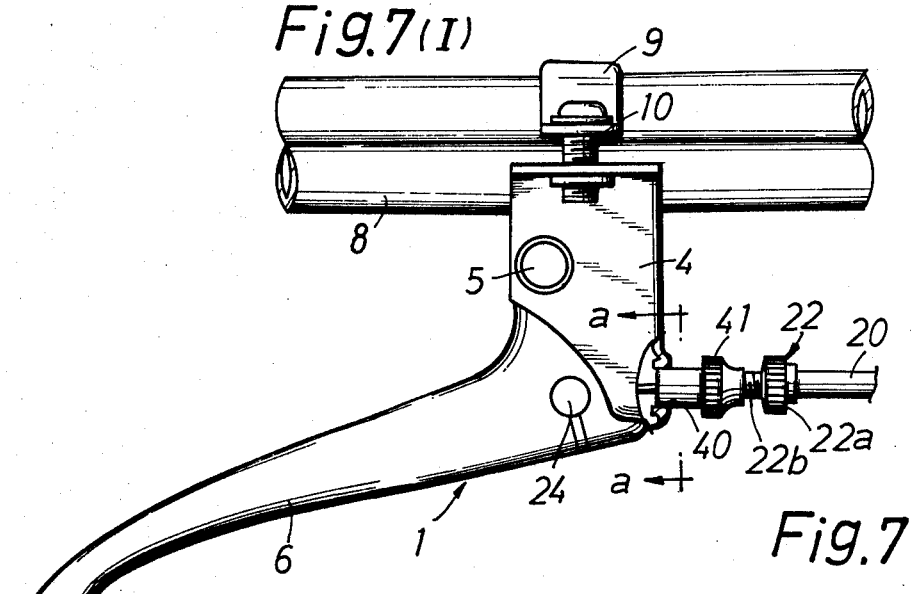
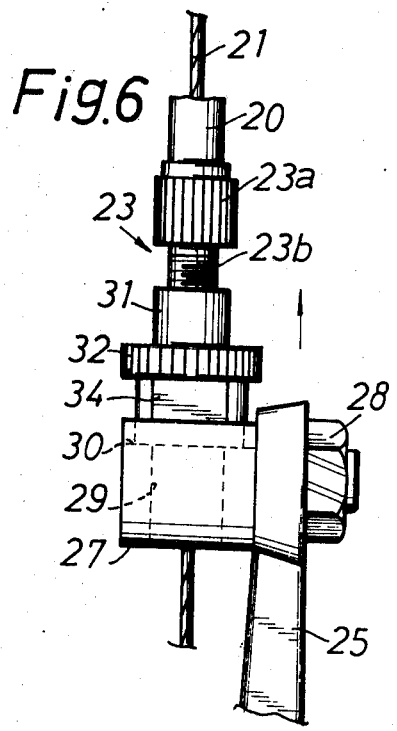
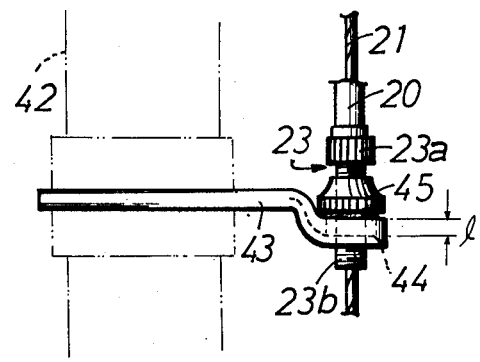

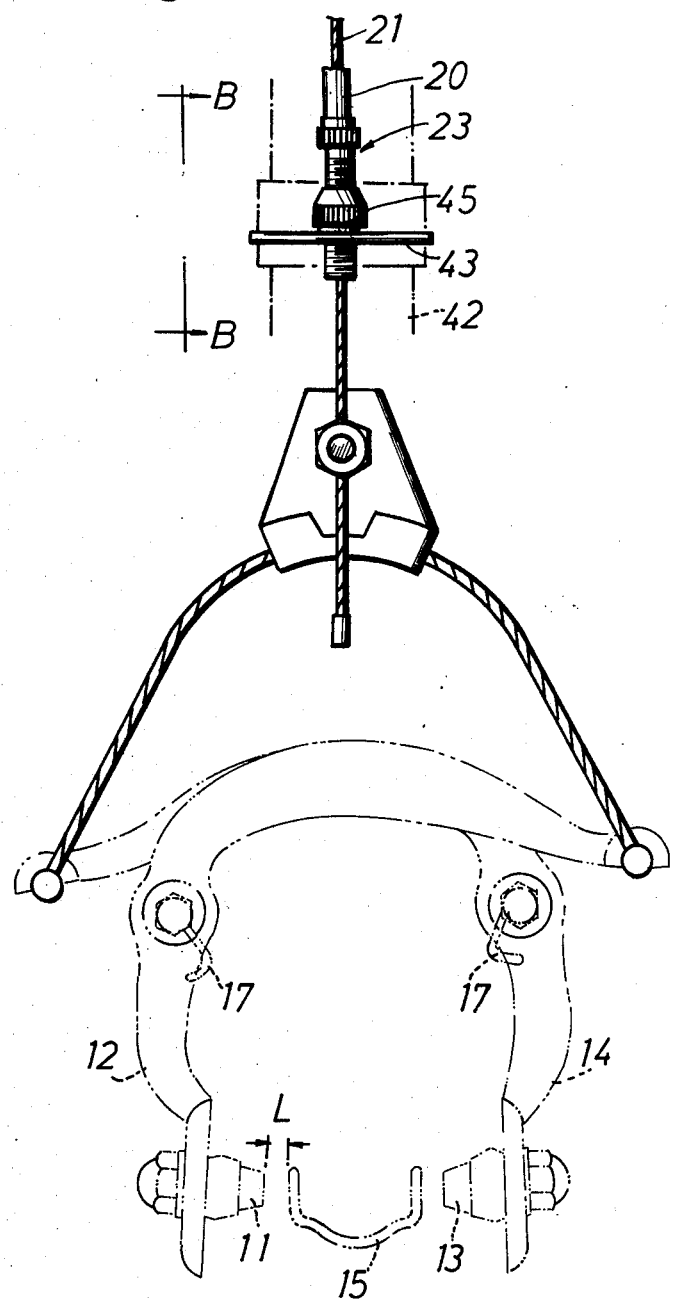

BRAKE ADJUSTING DEVICE FOR BICYCLES

BACKGROUND OF THE INVENTION

The present invention relates to a brake adjusting device for bicycles.

When the desired braking force lowers due to the wear of brake shoes or the elongation of bowden cable, there arises the necessity to properly adjust the clearance between the rim of the wheel and the working surface of the brake shoe by advancing an adjusting screw member provided at one end of the bowden cable connected to the brake or at the other end thereof connected to the brake operating member to enable the inner element of the bowden cable to exert a greater pulling force or to increase the pushing force of the other element of the cable. However, since the adjustment described above is effected manually by rule of thumb, it is extremely difficult to advance the adjusting screw by such an amount as to give an optimum brake clearance which is usually about 2 mm. Not infrequently, therefore, the adjusted clearance is greater or smaller than the proper value, entailing further difficulties in ensuring safety performance. More specifically, if the clearance is larger than the proper value, a delayed braking action will result. Conversely a smaller clearance gives rise to an abrupt braking action and leads to a falling accident. The conventional adjusting means therefore involves serious problems in securing safety.

SUMMARY OF THE INVENTION

An object of this invention is to provide a device for adjusting the brake of bicycles which device is always capable of properly adjusting the brake clearance by virtue of the provision of gauge means so as to compensate for a reduction in the braking force, although the adjustment is made manually.

Another object of this invention is to provide a device by which the brake clearance is readily properly adjustable by a simple procedure.

Still another object of this invention is to provide a device which is simple in construction and easy to incorporate into a brake system.

These and other objects, features and advantages of this invention will become more apparent from the following description given with reference to the accompanying drawings showing embodiments of the invention only for illustrative purposes.

BRIEF DESCRIPTION OF THE DRAWINGS

FIG. 1 is a front view showing an embodiment of the device of this invention;

FIG. 2 is a enlarged front view showing the principal part of FIG. 1;

FIG. 3 is a view in vertical section of FIG. 2;

FIG. 4 is a view in section taken along the line A—A in FIG. 2;

FIGS. 5 and 6 are a front view and a side elevation illustrating brake adjusting procedure;

FIG. 7 (I) is a front view partly broken away and showing another embodiment of this invention;

FIG. 7 (II) is a view of the same taken along the line $a$—$a$ in FIG. 7 (I);

FIG. 8 is a front view showing another embodiment; and

FIG. 9 is a view of the same taken along the line B—B in FIG. 8.

DESCRIPTION OF THE PREFERRED EMBODIMENTS

FIG. 1 shows a caliper brake of the side-pull type employed in a bicycle. The brake system comprises brake operating means 1, brake means 2 for braking the front wheel or rear wheel of the bicycle and a bowden cable 3 interconnecting the brake operating means 1 and the brake means 2 to transmit the operating force of the former to the latter.

The brake operating means 1 includes a housing 4 and a brake operating lever 6 pivotably supported by a lateral pin 5 on the housing 4. The housing 4 has a tubular front member 7 fitting in an open lower portion of its front wall and is fastened to a handle bar 8 by a bracket 9 and a screw 10, with the upper end of the housing in contact with the under surface of the bar 8. When the brake operating means 1 is thus mounted in position, the free end of the brake operating lever 6 downwardly extends rearward at a specified angle with respect to the bar 8.

The side-pull caliper brake serving as the brake means 2 includes a large arch 12 provided with a brake shoe 11 at its lower end and a small arch 14 similarly having a brake shoe 13 at its lower end. The large and small arches 12 and 14 are pivotally supported by a bolt 16, with the shoes opposed to each other at the opposite sides of the rim 15 of the wheel. The arches are biased by a spring 17 in such directions that the brake shoes 11 and 13 thereon are always urged away from each other. When the arches are thus spring-loaded, each of the end surfaces of the brake shoes 11 and 13 is spaced apart from the side of the rim 15 opposed thereto by a distance which is herein referred to as "brake clearance L." The proper value of the brake clearance L is about 2 mm.

The bowden cable 3 comprises an outer element 20 including a coiled spring 18 and a plastic tube 19 covering the spring 18, and an inner element 21 in the form of a strand wire and extending through the outer element 20. The opposite ends of the outer element 20 fixedly fit in adjusting screw members 22 and 23.

The adjusting screw members 22 and 23 comprise heads 22a and 23a of large diameter and hollow threaded tubes 22b and 23b having a smaller diameter and integral with the heads respectively. The cable 3 interconnects the brake operating means 1 and the brake means 2 in the following manner.

The hollow threaded tube 22b of the adjusting screw member 22 loosely fits in the tubular member 7 attached to the housing 4. One end of the inner element 21 extending through the threaded tube 22b is connected to the brake operating lever 6 by means of a connector 24. The hollow threaded tube 23b of the other adjusting screw member 23 is connected by screw-threaded means to the front end of an arm 25 extending from the small arch 14. The outer end of the inner element 21 extending through the threaded tube 23b is fixed to the distal end of the large arch 12 by a connector 26.

According to this invention, the brake system described above is provided with adjusting means at least at one end of the bowden cable 3. FIGS. 1 to 4 show the adjusting means as it is disposed close to the brake means 2.

FIGS. 2 to 4 show a gauge member 27 secured to the end of the arm 25 by a nut 28. The gauge member 27 is formed with a bore 29 extending diametrically therethrough for passing the inner element 21. The gauge member 27 is further cut out in its axial direction at one end of the bored portion 29 to provide a gauge groove or hole 30. The gauge groove 30 has a depth $l$ which corresponds to the proper brake clearance L so as to give the desired brake clearance for the adjustment of the brake.

A nut 31 has a flange 32 at an intermediate portion of its outer periphery and a threaded bore 33 axially extending therethrough for receiving the hollow threaded tube 23b of the adjusting screw member 23 in screw-thread engagement therewith. The nut 31 is fittingly engageable in the gauge groove 30 of the gauge member 27 and is disengageable from the grooved portion 30 to rest on the upper edges of the grooved portion 30 as seen in FIG. 5. Accordingly, the nut 31 having a circular section is cut out on its opposite sides to provide parallel planar surfaces 34 as illustrated in FIG. 4. When the nut 31 fits in the gauge groove 30 as seen in FIGS. 2 and 3, the planar surfaces 34 are in face-to-face relation to the upright walls defining the gauge groove 30, whereas when the nut 31 is moved out of engagement with the grooved portion 30 and then turned for example through 90°, the lower end of the nut 31 is positionable on the upper edges of the grooved portion 30 as shown in FIG. 5.

FIG. 1 further shows a pair of legs 35 downwardly extending from the shoe carrying ends 36, 37 of the large and small arches 12, 14. The base portions of the legs are fastened in position between shoe holders 38, 39 and the shoe carrying ends 36, 37.

With the device of this invention described above, the brake is adjustable by the following procedure when the intended braking force decreases owing to the wear of the brake shoes 11, 13 or the elongation of the inner element 21.

First, the pair of legs 35 are grasped and forced toward each other against the action of the spring 17 to thereby reduce the distance between the connectors 24 and 26. In this state, the nut 31 is pulled out of the gauge groove 30 of the gauge member 27 in the direction of the arrow in FIGS. 5 and 6 and is then turned about its axis.

Because the nut 31 is now so positioned that the planar surfaces 34 are out of alignment with the walls defining the gauge groove 30 and because the large and small arches 12 and 14 are always spring-loaded as at 17, the lower end of the nut 31 will rest on the upper edges of the grooved portion 30 as seen in FIG. 5 when the legs 35 are thereafter relieved of the grasping force.

If the ends of the brake shoes 11 and 13 are in contact with the rim 15 when the nut 31 is in this position, there is no need to adjust the brake, since the displacement of the nut 31, namely the depth $l$ of the gauge groove 30, is so determined as to give the proper brake clearance L. On the other hand, if the ends of the brake shoes 11 and 13 are apart from the rim 15 when the nut 31 is in the position of FIG. 5, this evidences the wear of the brake shoes 11 and 13 or the elongation of the inner element 21. In this case, the adjusting screw member 23 screwed in the nut 31 is advanced on the nut 31 to bring the shoes 11 and 13 into contact with the rim 15. Subsequently, the nut 31 is turned about its axis to fit the lower end of the nut into the gauge groove 30, whereupon the brake shoes are moved away from the rim 15 and the brake is thereby properly adjusted since the depth of the gauge groove 30 is preset as the proper brake clearance L.

FIG. 7 shows another embodiment in which the opening of the housing 4 is provided with a gauge recess or hole 40 having a depth which determines the proper brake clearance L. The embodiment includes a nut 41 having such external configuration that it is fittable in the gauge recess 40 but is not fittable therein when removed therefrom and then turned a desired angle. The adjusting screw member 22 is screwed in the nut 41. By this embodiment the brake is adjustable in the same manner as above.

FIGS. 8 and 9 show another embodiment adapted for use with a caliper brake of the center-pull type. A bracket 43 mounted on a handle post 42 is formed with a gauge recess or hole 44 having a depth for setting the proper brake clearance L. A nut 45 has a lower end so shaped that it is fittable in the gauge recess 44 but is not fittable therein when removed from the recess 44 and then turned through a desired angle. The adjusting screw member 23 is screwed into the nut 45. This embodiment functions in the same manner as above for the adjustment of the brake.

What is claimed is:

1. In a brake system for a bicycle comprising brake means including brake shoes movable into or out of contact with the rim of a wheel to brake the wheel, and a bowden cable including an inner element and an outer element interconnecting the brake means and a brake operating lever to transmit a grasping force on the lever in a direction to actuate the brake means, a brake adjusting device comprising adjusting means provided at least at one end of the bowden cable, the adjusting means including a gauge member having a bore for passing the inner element therethrough and a non-circular hole, including side portions, formed at one end of the bored portion and having a depth equal to a proper brake clearance, a nut having a portion shaped to fit in the hole of the gauge member only when aligned therewith and to positively engage the side portions thereof to prevent any rotation of the nut relative to the guage member, and an adjusting screw member screwed in the nut and connected to the outer element, wherein the adjusting screw member is movable on the nut, in screw-thread engagement therewith, until the ends of the brake shoes come into contact with the rim while the nut is not aligned with the hole of the gauge member, and the nut is fittable into the hole of the gauge member after the shoes contact the rim to thereby provide the proper brake clearance.

2. A brake adjusting device as defined in claim 1 wherein the adjusting means is provided on the brake means.

3. A brake adjusting device as defined in claim 1 wherein the adjusting means is disposed in a housing which supports the brake operating lever.

4. A brake adjusting device as defined in claim 1 wherein the brake means is a caliper brake of the center-pull type and the adjusting means is disposed close to the brake means.

* * * * *